Patented Sept. 15, 1931

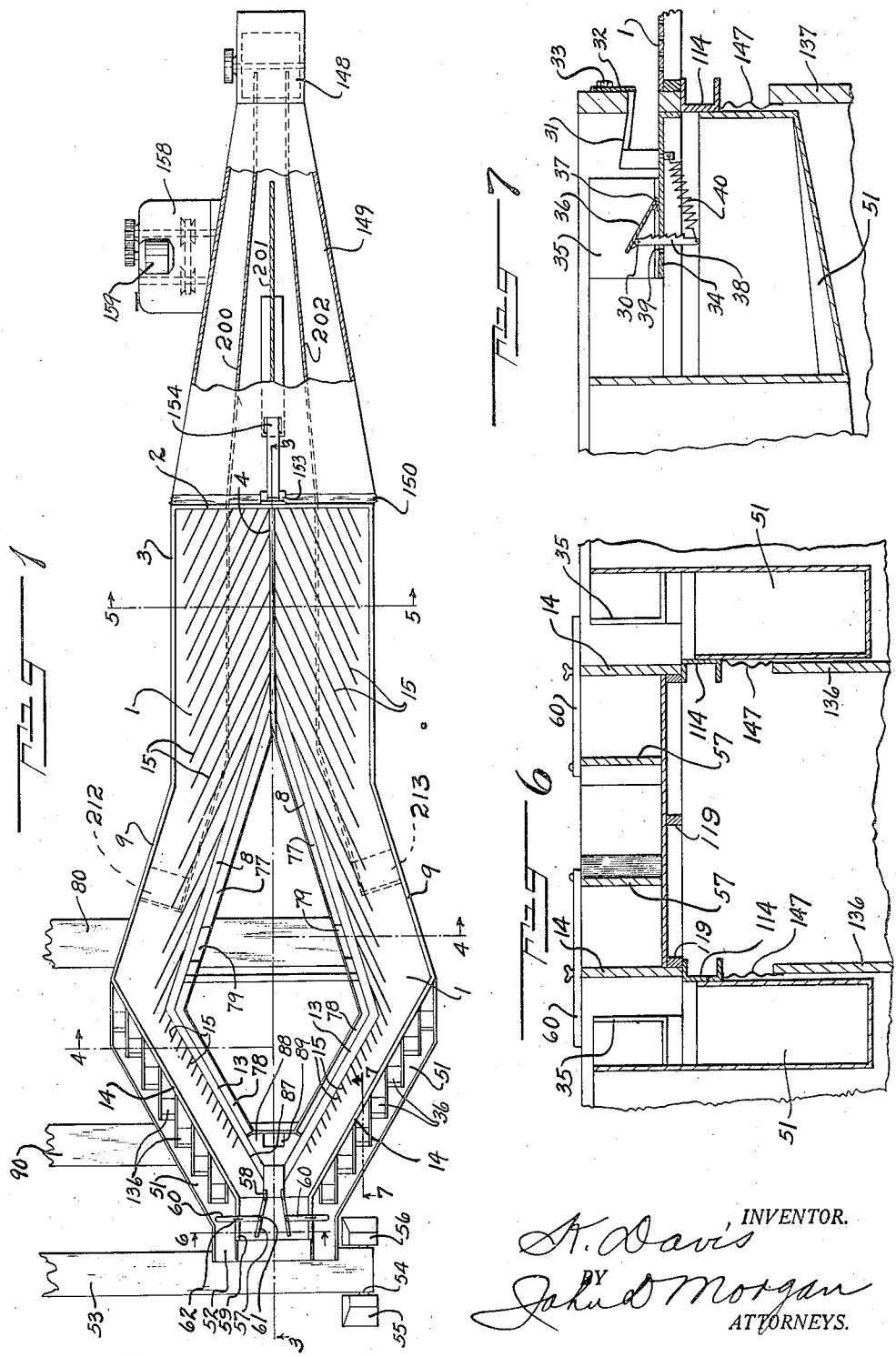

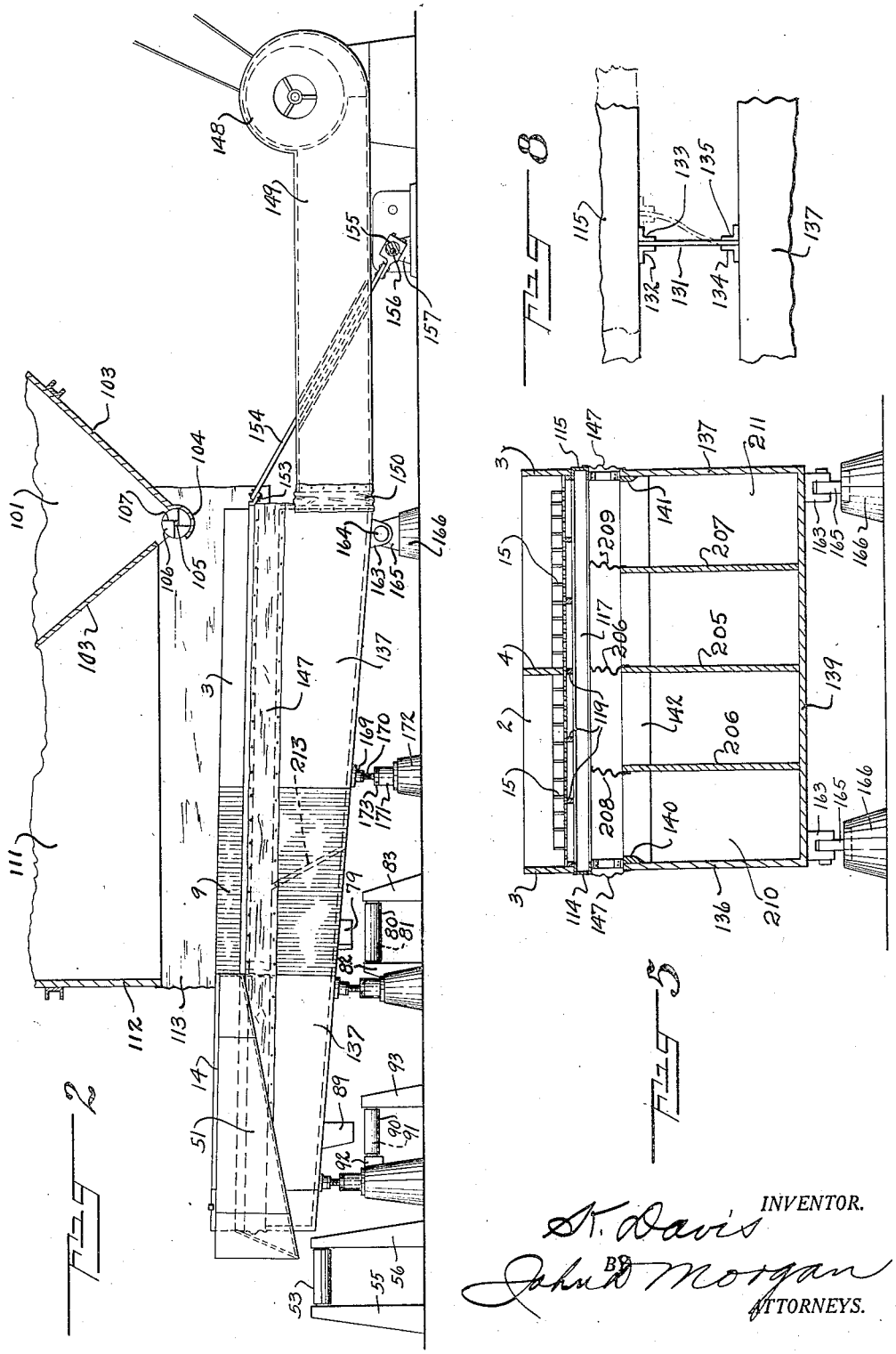

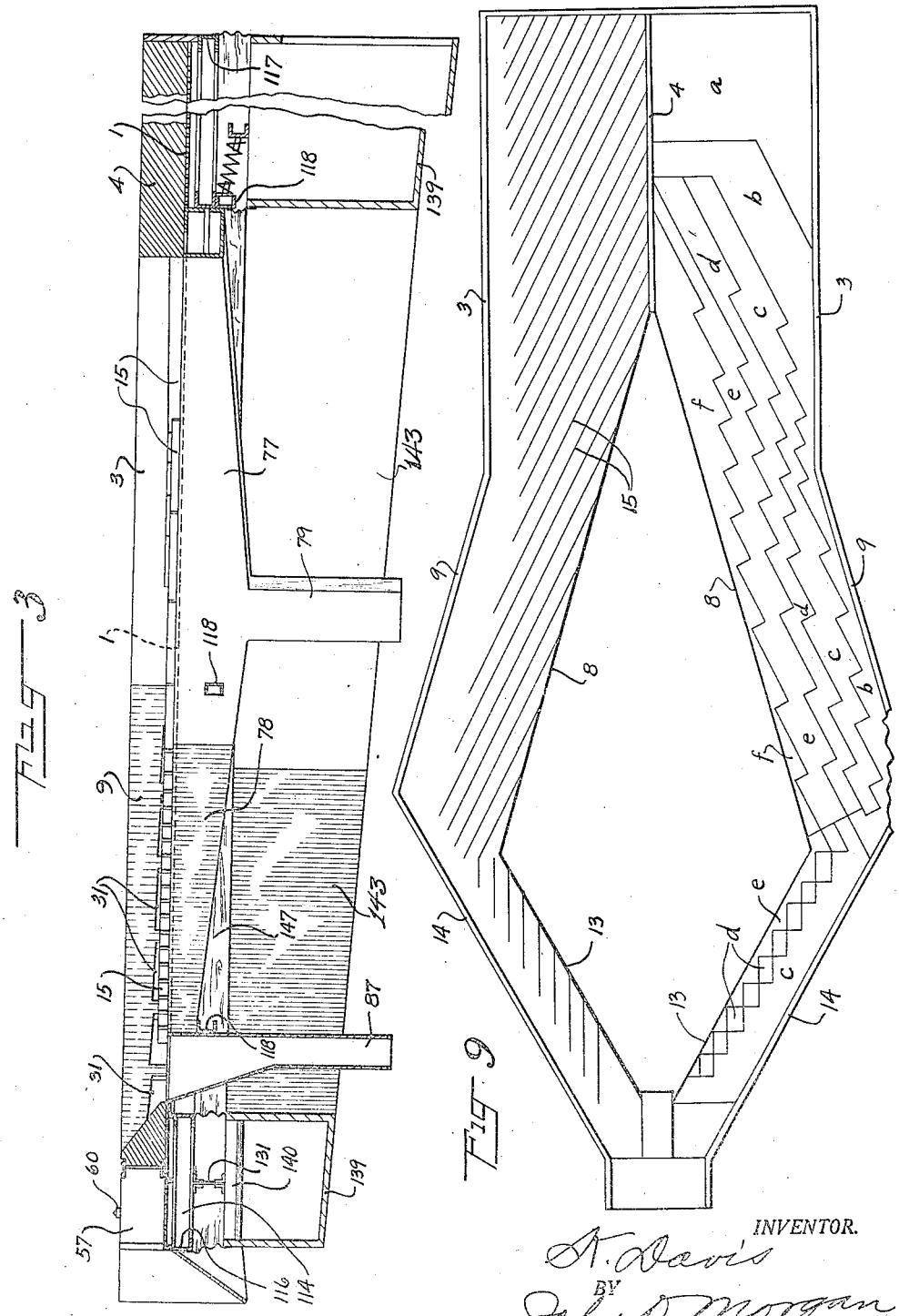

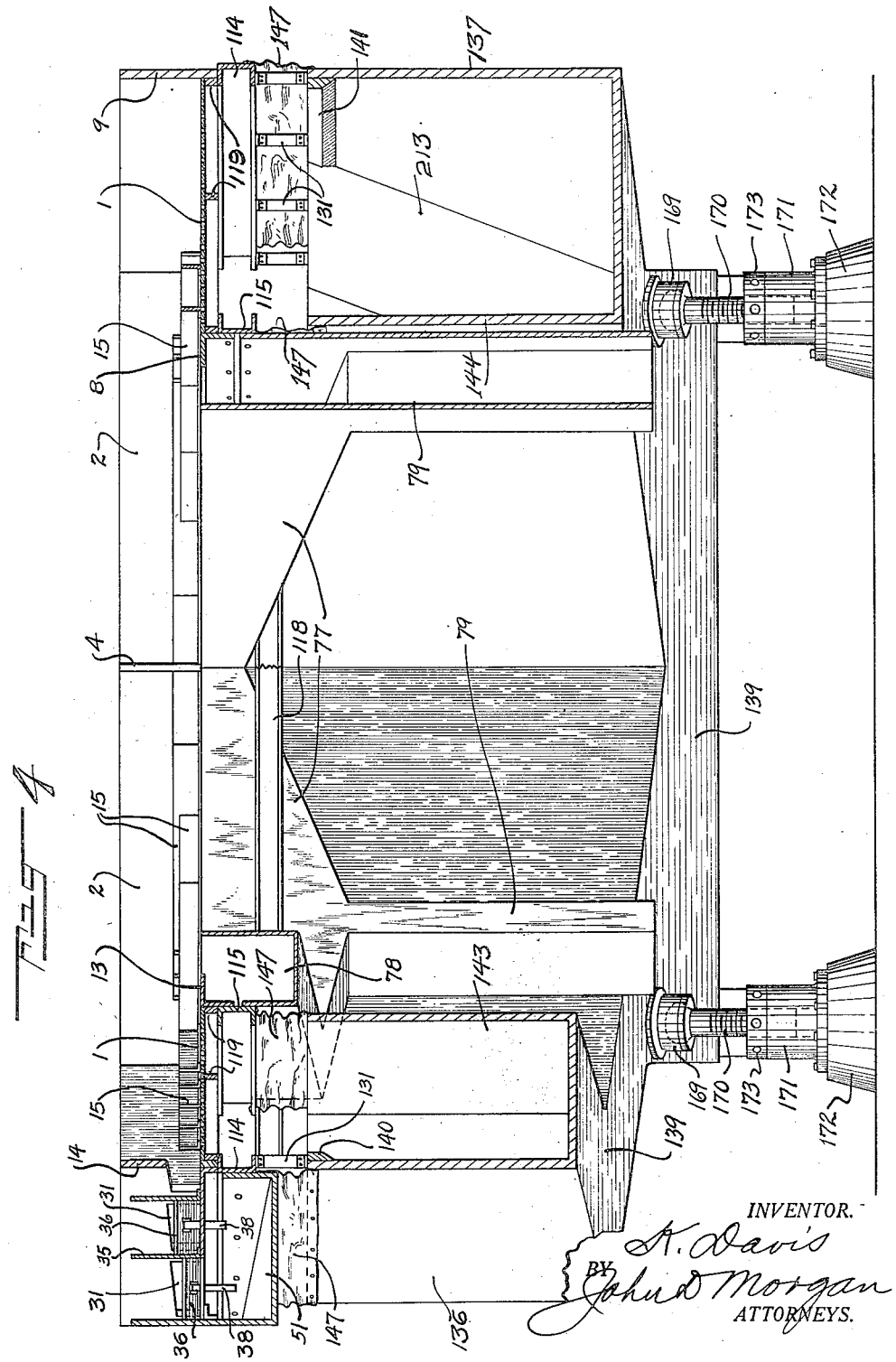

1,823,848

UNITED STATES PATENT OFFICE

KENNETH DAVIS, OF EBENSBURG, PENNSYLVANIA, ASSIGNOR, BY MESNE ASSIGNMENTS, TO PEALE-DAVIS COMPANY, OF WILMINGTON, DELAWARE, A CORPORATION OF DELAWARE

PROCESS AND MECHANISM FOR SEPARATING INTERMIXED DIVIDED MATERIALS

Application filed April 19, 1926. Serial No. 102,906.

The invention is directed to a novel and useful process and mechanism for separating intermixed divided materials of different specific gravities; and more particularly to a process and mechanism for separating such materials which vary relatively greatly in the size of the intermixed fragments or particles, while on the other hand, varying relatively little in their specific gravities.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a top plan of a material separating mechanism constructed in accordance with the invention;

Fig. 2 is a side elevation of the mechanism of Fig. 1, looking thereat from the bottom side, and showing also the overhead structure;

Fig. 3 is a central, vertical, longitudinal section, taken on line 3—3 of Fig. 1, on a somewhat larger scale;

Fig. 4 is a transverse, vertical section, on an enlarged scale, taken substantially on line 4—4 of Fig. 1;

Fig. 5 is a transverse, vertical section, likewise on an enlarged scale, taken on line 5—5 of Fig. 1;

Fig. 6 is an enlarged, transverse, vertical section, taken on line 6—6 of Fig. 1;

Fig. 7 is a greatly enlarged, fragmentary, vertical section, taken on line 7—7 of Fig. 1;

Fig. 8 is a fragmentary detail of the reciprocable mounting for the reciprocable table;

Fig. 9 is a diagrammatic view, corresponding to Fig. 1, showing the preferred air-pressure zoning.

The present invention, in certain of its aspects, is an improvement on the invention of my copending application Ser. No. 39,432, filed June 25, 1925; but in many of its features my present invention is also applicable to many other kinds of mechanisms for separating intermixed, divided materials.

The invention comprises a process and mechanism for separating intermixed divided materials, and delivering the different separated materials apart from each other and free from intermixture. The invention is directed more particularly to providing an improved process and mechanism whereby intermixed materials are successfully separated, wherein the fragments or particles of the various materials vary very greatly in size, and wherein the various intermixed materials differ relatively but little in their specific gravities; the rapid and successful commercial separation thereof thus presenting a very difficult problem.

The expression "intermixed divided materials" is used for convenience herein in designating a mixture comprising two or more materials in granular, fragmentary, pulverulent, or other like state, whether natural or due to previous handling or operations.

An example of materials, in the mechanical conditions and having the physical properties already described, is a mixture of coal, "bone", and rock and other impurities, as it comes from the mine, and the present invention in actual practice has been chiefly directed to the automatic cleaning of the coal as it comes out of the mine, and without previous preparation or handling.

One of the principal and most valuable features of my process and mechanism is, the ability to practically completely separate coal, "bony" and rock without the preliminary "sizing" which has heretofore been necessary, and which constitutes a tremendous and practically prohibitive item of labor and expense. By my invention, I am enabled to practically complete the separation of the coal, "bony" and rock, as it comes from the mine, from the finest dust up to pieces three inches in dimensions, by a single operation and by running it over merely a single cleaning table, the coal going direct to the cars, and the rock to the rock heap, and the bony being handled in any way desired.

According to previous commercial practice, except by the cleaning tables disclosed in and covered by certain of my copending applications, it has been necessary to very closely size the coal by preliminary screening before attempting the automatic separation of the intermixed coal, bony and rock.

As an example of necessary previous commercial screening preparatory to separating:—All sizes above two inches were screened out; from two inches to 1 and ½ inches were screened as the next size; then from 1½ inches to 1 inch; from 1 inch to ½ inch; from ½ inch to ¼ inch; from ¼ to ⅛ inch; from ⅛ inch to 1/16 inch; and from 1/16 inch down were screened out on successive screens. Each of these sizes is then sent to a different separating table. Thus seven or eight different screens are required and seven or eight separating tables, one for each different size of the intermixed materials produced by screening, making about fourteen or more machines and operations in all.

By my invention, I dispense with all of the screening mechanisms of the prior art and with all but one of the separating tables. I use only a single large separating table, and over this single table I send the unprepared, intermixed materials, which prior to my invention were necessarily sent first over the several screening mechanisms, and then over the corresponding separating table, as described in the preceding paragraphs. I am able on this one table to practically completely separate the coal, rock and bony and other impurities from three inches in dimension down to the finest dust.

My invention is applied to the separation of a continuous and forwardly flowing bed of the intermixed, divided materials, such as the unsized mixture of coal, bony and rock, the bed of materials undergoing separation being supported upon an air pervious table, through which a blast of air is driven from beneath upwardly through the bed of material, the table at the same time being moved or reciprocated to mechanically forward the separated heavier material, which has settled down upon the table, by friction and inertia toward a place of delivery, the gradation of the force of the air current and the table structure cooperating in the novel manner hereinafter set forth to accomplish the desired result.

The invention provides broadly for feeding on the material at a locus which is at or near the rear end of the separating table, and preferably entirely across this end, at such rate as to build up at the beginning, and thereafter to continuously maintain, upon the table a bed of materials of substantially uniform thickness, which moves gradually forwardly over the table. The materials undergo progressive separation, due to the combined air and mechanical actions, as they move forwardly, gradually approaching complete separation, which is effected before the separated materials are delivered from the table.

By my present invention, the intermixed materials are fed on preferably entirely across the rear end of the air pervious table, and beginning at this time and continuing progressively forwardly along the table, the intermixed particles or fragments of material are loosened apart and separated from each other, and the lighter material gradually forms a flotant top stratum, and the heavier material gradually settles and comes to rest upon the table, and thereafter is progressed forwardly by the combined action of friction and inertia to a place of delivery.

Broadly considered, in connection with the foregoing, the process and table of my present invention, in addition to creating this superior flotant strata of the lighter material, provides also for this stratum traveling forwardly in a straight and unconstrained path and at the end of its straight and unconstrained path, to be delivered from the table, thereby giving the shortest and most natural flow to the superior flotant material.

The heavier separated material comes to rest upon different parts of the table as the stratification and separation progresses, and is then moved along the surface of the table sharply transversely to the side edge thereof, by friction and inertia. It is thus propelled immediately and directly from any point of settling upon the table and immediately removed from the forwardly-flowing stream of material, which gradually becomes composed only of the lighter material. There is thus no further tendency to, or opportunity for, intermixture of the separated and settled heavier material with the forwardly-flowing stream of lighter material, or that part of the forwardly moving bed which may still be undergoing further separation.

My invention further provides for the early and gradual, or step-by-step discharge of the heavier material from the side edge of the table at a plurality of successive points therealong. The forward part of the table by the change in angular conformation thereof, aids greatly in this gradual, and relatively immediate, discharge of the separated and settled heavier material.

In connection with the foregoing, the air action is cooperatively proportioned and disposed to produce the completest and most satisfactory result in the difficult task of completely, or practically completely, separating the particles of intermixed material of such widely divergent dimensions and so closely related in relatively specific gravity. Accordingly, the areas or zones of greatest air activity is at or near the place of feeding on of the intermixed materials, and decreases substantially forwardly along the table, and also decreases transversely across the table in the direction of movement of the lighter stratified material, in conjunction with the forward disposition already described. In the final inward and forwardly-disposed angled reach of the table, the air pressure preferably decreases from the outer edge toward the inner edge, that is, from the discharge edge for the heavier material toward the discharge edge for the lighter material.

The table unit of the present preferred form of my invention, comprises a rear reach (the intermixed materials being fed on at or near the rear end of this reach), which extends straight or directly forwardly. This reach has preferably a rear and two side bed-retaining walls. This reach is provided with spaced-apart separating partitions, extending from one side edge thereof toward the opposite side edge. They preferably abut on one side edge retaining wall, but terminate at some distance from the other, to provide a forwardly-extending passage along said side-edge for the separated heavier material, which moves into the passageway from between the separating partitions.

Communicating with and extending forwardly from the reach of the table just described, is a forwardly and outwardly angled reach, of generally similar structure. This reach conveys the separated heavier material and the last part of the still intermixed materials out of the path of the stream of separated and directly forwardly-flowing stream of the lighter and superior separated material. The lighter superior stratum of separated material is discharged from the table over the inner edge of this reach of the table. In this reach the separating process continues for the still unseparated part of the material, and the separating process is nearly completed in this reach.

The final reach of the table, opening from that last described, is angled both inwardly and forwardly, and is located forwardly beyond the place or edge of discharge of the directly forwardly-moving stream of stratified and separated lighter material. The outer and inwardly inclined edge of this reach constitutes a discharge locus for the separated heavier material, the discharge thereof being facilitated by the arrangement or disposition of this reach of the table. The discharge locus for the heavier material, however, is not necessarily entirely limited to this particular edge of the table.

As a matter of structural and operating convenience, the tables are preferably constructed in "duplex", one "right-hand" and another "left-hand". These are mounted side by side, and operated as a single unit, and this arrangement of two table units is shown in the drawings. This side-by-side arrangement of two table units has certain advantages, such as the utilization of single discharge facilities for certain of the products, greater capacity from a single unit, a single feeding-on mechanism, and other advantages as well.

Other features of the invention will be primarily described hereinafter, and it will be understood that the foregoing general description and the following detailed description are illustrative and exemplary of the invention, but are not restrictive thereof.

Referring now in detail to the embodiment of the invention, illustrated by way of example in the accompanying drawings, for convenience and efficiency in construction and operation, as already indicated, the table is constructed in duplex, that is, a right-hand table and a left-hand table are mounted on a common supporting structure, and are reciprocated together, and have a common feed for both tables. A description of one of these tables will suffice for both.

The table, considering it from the rear, or feeding-on end for the intermixed divided materials, comprises a forwardly and rearwardly disposed primary separating portion, which may be of rectangular form and is so shown. This part of the table, and the table throughout, has an air-pervious deck 1, for supporting the bed of materials, and at the rear end thereof it is provided with a transversely-disposed bed-retaining wall 2, projecting upwardly from the table. Connecting to the respective ends of the bed-retaining wall 2 are side-edge bed-retaining walls 3 and 4, disposed along and projecting upwardly from the side edges of the table.

From the forward part of this primary separating portion of the table, it is disposed at an angle, outwardly horizontally, so that the inner side edge of this angularly-disposed portion extends forwardly and transversely entirely across in front of the primary separating portion of the bed. This constitutes a spilling or delivery edge for the directly forwardly-moving superior stratum of lighter separated material. The outer side edge of this part of the table, considered with respect to this angle, has an upwardly-projecting bed-retaining wall 9, joining at its rear end with the wall 3, already described.

The table is preferably provided with a final separating reach or portion, which is transversely horizontally inclined in the opposite direction from the second or intermediate reach just described, the table preferably gradually narrowing throughout these angled portions. This third and reverse angled portion has an internal spilling edge 13 for the lighter material on the inner side, considered with respect to this angle, and a bed-retaining wall 14 on the outer side of the table, this wall at its rear end joining the wall 9, and extending forwardly to the front end of the table.

The cooperating material-stratifying and separating means comprise a plurality of spaced-apart, and preferably parallel, separating partitions 15, resting upon and projecting upwardly from the air-pervious bed-supporting deck of the table. These separating partitions preferably begin at the rear end of the table, with their rear ends abutting on the rear end wall 2, or on the side wall 4, and are disposed obliquely forwardly and laterally. Their other ends are proximate to, but are separated from, the side wall 3, so as to provide a longitudinally-disposed passageway for the settled and separated rock or other heavier material along this side edge of the table. The separating partitions may be of various heights in different parts of the table, and may vary in height longitudinally of themselves, such arrangements being shown in Figs. 3 and 4.

Thus the rock, as soon as it settles upon the bed, due to the reciprocation of the table and the constraining effect of the separating partitions is directed and impelled by friction and inertia directly out of the flowing forwardly-moving stream of the bed to the side edge of the table, and then forwardly along the side edge of the table.

In the intermediate separating reach of the table, the rear ends of the separating partitions abut on the spilling or delivery edge 8, over which the superior separated stratum of the lighter material in its direct longitudinal forward movement passes to delivery. These separating partitions also terminate short of the bed-retaining wall 9, by a suitable distance, to form the side channel way for the rock or other heavier material. This channelway may be of uniform width throughout, or it may broaden forwardly along the table, as desired. It is shown in the latter relation in Fig. 1 of the drawings.

In the final reach of the table, there are short separating partitions 15 with their rear edges abutting on the open spilling or delivery edge 13 for the stratified lighter material. These likewise preferably terminate short of the bed retaining wall 14, to constitute a side channel way for the stream of rock.

Means are provided by the invention for delivering the separated and settled rock, or other heavier material, at a plurality of points along the side of the table, and preferably throughout the length of the side wall 14. In conjunction therewith, devices are provided for regulating the rate of discharge of the rock or other heavier separated material, so as to prevent discharge of other material, and to prevent remixture of the separated materials.

As embodied (Figs. 1, 3, 4 and 7), a plurality of apertures 31 are formed in the wall 14, the bottoms being flush with a deck 1 of the table, and the top edge of the apertures being variably positionable to change the height of the discharge aperture. For this purpose, as embodied, a vertically slidable and positionable plate 32 is mounted on the inner side of the wall 14 by bolt-and-slot connections 33.

Exteriorly to the respective openings 31 is a chute or passageway, having a bottom 34 and side walls 35. Devices are provided in the chute for regulating the rate of spillage of the rock or other heavier material, so as to maintain it practically level with the top of the aperture 31. Said device comprises an outwardly and upwardly inclined plate 36, pivotally connected at 37 to the bottom 34 of the chute.

To variably inclinably position the plate 36, there is pivoted thereto at 30 a notched bar 38, which extends downwardly through an opening 39 in the bottom 34 of the chute. A tension spring 40 is connected to the bottom end of the pivoted bar 38 and to the machine frame, so as to hold one of the notches on the bar against the top edge of the opening 39, thereby retaining the plate 36 in the desired position. The various chutes discharge into a collecting chute 51, which is forwardly and downwardly inclined, and has a mouth 52 discharging onto an endless conveyor belt 53, running over rollers 54, journaled in supports 55 and 56.

Some of the rock or other heavier material may be discharged at the extreme forward end of the table, and such an arrangement is shown in Fig. 1. Discharge regulating means such as have been already described may be also used at this point, or a different form of such means may be used. As embodied, there is shown at this point a gate 57, carried on a vertically-disposed hinged support 58, mounted on the table structure. The gate is swingable along the table surface toward and away from the forward end 59 of the wall 14. Means are provided for holding the gate 57 in desired position, to vary the discharge passage for the rock, and for this purpose a bar 60 is pivotally connected to the top edge of the gate at 61, and has a bolt-and-slot connection 62 on the top edge of the side wall 59. Thus the flow of rock through the forward end passage of the table may be regulated so as to discharge all the rock or other heavier material reaching this point, and to prevent the discharge of lighter material.

Means are provided for collecting the stratified and separated stratum of coal or other lighter material, which spills over the edges 8 and 13, and for this purpose a downwardly and forwardly inclined chute 77 is supported along and beneath the table edge 8, and a similar chute 78 is supported along and beneath the spilling edge 13 and partly along the forward end of the edge 8. These two collecting chutes empty in a vertically-disposed chute 79, which in turn discharges upon an endless conveyor belt 80, this belt running over rollers 81, journaled in bearings 82 and 83, the belt conveying away the cleaned coal or other lighter material.

Means are provided by the invention for separating, if desired, an intermediate product such as the "bony", commonly found in bituminous coal. In the embodied form, a discharge edge 87 is provided, which may be the forward part of the discharge edge 13, and the material from this empties into an inclined chute 88, which terminates in a vertical chute 89 discharging onto an endless belt 90. The belt 90 runs over rollers 91, journaled in supports 92 and 93.

Means are provided for feeding the intermixed divided materials regulably to the table, so as to maintain the bed of materials undergoing separation of the desired and efficient thickness upon the table. The embodied form of said means comprises a chute having side walls 101 and downwardly and inwardly inclined front and rear walls 103. In an opening at the bottom of the chute is provided a regulably driven feeding device.

As embodied, this comprises a transversely and horizontally disposed parti-cylindrical plate 104, and interiorly of this plate is a transversely and horizontally disposed shaft 105, journaled in the side walls. Fixed on shaft 105 are a plurality of circular discs 106, and between these discs and fixed thereto are a plurality of plates 107, arranged tangentially to the shaft 105 and extending outwardly along the discs. Variable speed driving means are provided for the feeding mechanism, which may be of any known or suitable form, and is not shown.

Means are provided for collecting the dust which is projected upwardly from the bed of materials by the air currents and a portion thereof is shown as a housing, supported above the table, and having side-walls 111 and end-walls 112, the feeding mechanism being conveniently built into one end of the dust-collecting mechanism. The dust-collecting devices may be of any known or suitable form, and these collect and concentrate the dust and render it available for commercial use.

A flexible air-impervious curtain 113 is suspended by its top edge from the bottom edges of the dust-collecting housing, and this curtain extends downwardly around the table. The table is longer and projects forwardly from the dust collector, as shown in Fig. 2, as there is very little dust created at the forward end of the table, and this leaves this part of the table free and open for inspection.

Referring now to the reciprocable mounting mechanism for the table, the table proper is carried upon a frame consisting of channel beams, having side reaches 114 and 115, and end reaches 116 and 117, and cross members 118, as may be found necessary or desirable. An auxiliary supporting frame, consisting of supports 119 may be provided beneath the table, as shown best in Figs. 3, 4 and 5. These devices constitute the upper part of the air chamber and with the table are longitudinally reciprocable with respect to the main body of the chamber.

In the illustrated construction, the main body of the air chamber is non-reciprocable, and at its upper part is connected to the reciprocable table by a flexible air-impervious fabric, which permits the reciprocable motion, while maintaining the air-tight connection. The main air chamber is preferably tiltable together with the table, to vary the longitudinal inclination thereof.

The illustrated form of reciprocable mounting for this structure comprises a plurality of vertically-disposed metal strips or thin bars 131, (Figs. 4 and 8) riveted at their upper ends to angle pieces 132 and 133, fixed to the lower faces of the frame channel bars 114 and 115. The lower end of the strips 121 are fastened by means of angle pieces 134 and 135 to the top edges of side walls 136 and 137 of the non-reciprocating air chamber body. The air chamber has also a bottom 139. The side walls 136 and 137 of the air chamber are angled to conform to the angled form of the table, as best appears from Figs. 1 and 4. Each of the tables is provided forwardly from the common structure at the rear end with angled, vertical, inner air chamber side walls 143 and 144, respectively, angled to correspond to the tables and to the outer side walls 136 and 137 of the air chamber.

Like the table, the air chamber is duplex in form to correspond to the table structure, and certain features thereof will be described in detail later. The upper edge of the vertical walls of the air chamber are provided with a reenforcing frame, having side reaches 140 and 141 and an end reach 142, which also carry the supports for the reciprocating table already described. Constituting a flexible air-impervious connection between the reciprocating and non-reciprocating parts of the air chamber is a flexible envelope 147, having its upper edges all around connected to the reciprocating table-supporting frame 114—117, and its bottom edges attached to the top edges of the non-reciprocating part of the air chamber.

Means are provided for forcing air under pressure up through the bed of materials upon the table, and these may be of any suitable or desired kind. As shown, a blowing fan 148 connects to a conduit 149, which communicates by a flexible air-impervious connection 150 with the rear end of the non-reciprocating air chamber body. It will be understood that the fan may be driven at variable speed, as desired.

Means are likewise provided for reciprocating the table, and as embodied, an eared lug 153 is fixed to the central part of the rearmost transverse member 117 of the reciprocable table-supporting frame. Pivotally connected thereto is an actuating rod 154, which rod at its rear end is mounted upon an eccentric 155, fixed on a shaft 156, journaled in supports 157. This shaft is driven by a speed-reducing gear 158 from any suitable motor 159. The table supports are preferably arranged so that the short reciprocating movement of the table is upwardly and forwardly and downwardly and backwardly.

Means are also preferably provided for varying the inclination of the table, considered longitudinally thereof. As embodied, said means are applied to the non-reciprocable body of the air-chamber. In this form, a plurality of eared lugs or brackets 163 are fixed to, and project downwardly from, the rear side edges of the air-chamber body. These brackets have pivotal connections 164 with similar brackets 165, carried on supports 166. Mounted at various points along the bottom side edges of the air-chamber are a plurality of socketed bearings 169, each supported, respectively, on a ball-headed screw-threaded rod 170, which projects into a vertically-disposed hollow cylinder 171, mounted on a support 172. An adjusting nut 173 is screw-threaded on the respective rod 170, and rests upon the top surface of the cylinder 171. By turning the nuts 173, the inclination of the entire table may be varied as desired.

The air perviosity of the table is preferably varied throughout, both with respect to its length and breadth and in special relation to the paths of travel of the materials undergoing separation, and the progressive degrees or stages of separation. This may be effected in different ways. When the table deck consists of perforate metal plates, the number and size of holes in the different plates may be varied as desired.

The present preferred manner or ratio of air-zoning is diagrammatically shown in Fig. 9 in connection with the duplex or double right-handed and left-handed forms of table, the arrangement of the different degrees of air perviosity being shown on one table and the present preferred arrangement of the separating partitions on the other table for comparison. It will be understood that the changes in air perviosity may be graduated in greater or lesser degree as desired, rather than being separated into definite zones.

In the diagram of Fig. 9 the areas of greatest air perviosity are indicated by $a$, giving the greatest intensity of air currents, and the least degree of air perviosity is indicated by $f$, giving the least intensity of air currents through the deck, the intermediate degrees being indicated by the intervening letters. From this diagram it will be seen that the intensity of the air currents decreases forwardly along the straight-ahead flow of the superior and lighter stratum of coal, and that the air current intensity decreases also along the forward and outward flow or movement of the rock or heavier settled material, though in different relation and degree. It will be understood that changes may be made therein with a view to greater efficiency with different kinds of intermixed materials or with such materials in different physical states.

Means are likewise provided, in accordance with certain features of the invention, for controlling the direction and intensity of the air currents in the air chamber to correspondingly vary the intensity of the air action through the different parts of the bed of materials upon the table, and so as to secure the best and most efficient results for the degree or stage of separation at that part of the table. It will be understood that these means may be varied widely in form and location, to best meet the needs and requirements for any particular kinds of intermixed materials undergoing separation, or the physical state of such intermixed materials.

As exemplarily embodied (Figs. 1, 2 and 5), the air conduit 149, coming from the blower fan 148, or other source of air-current supply, is divided by a plurality of spaced-apart, side-by-side vertical walls, shown as three in number, 200, 201 and 202 although this number may be varied as desired. These walls extend from the floor to the top of the air passageway 149, thereby dividing it into a plurality of separate side-by-side air-conducting channels. In the air chamber structure under the table, the central partition 201 is continued as a vertically-disposed, longitudinally-extending partition 205, fixed to the floor 129 of the air chamber.

A flexible, air-impervious member is provided between the top edge of partition 205 and the reciprocating table above it. Accordingly, there is fixed to the top edge of partition 205, by its lower edge, a strip of canvas 206, the top edge of which is fixed to the bottom side of the table, and may be conveniently attached to one of the supporting strips 119. This allows for the reciprocatory motion of the table while maintaining the separation between the air conduits. The wall 205 terminates fowardly at the end of the straight fore-and-aft side wall 4 of the table. That is, where two tables are conveniently mounted, right-hand and left-hand with respect to each other, and as shown in the drawings, this partition 205 is common to the two tables just as is the side bed-retaining wall 4.

Each of the air-passage-forming walls 200 and 202 may be the same in structure, one being part of one of the tables and the other a part of the other table, and a single description will suffice. The forward ends of these air-passage walls 200 and 202, terminate respectively in vertically-disposed walls 206′ and 207, extending upwardly from the floor 139 of the main part of the air chamber. These extend longitudinally forwardly beneath the straight fore-and-aft reaches of their respective tables, and are then angled to extend in the like relation along the first transversely angled part of the table, as best shown in Fig. 1. Each of these walls at its top is connected with the bottom face of the separating table by flexible, air-impervious members 208 and 209, which permit the table to be reciprocated while maintaining the air-impervious partitions as already described.

The air passages 210 and 211 formed between the partitions 206′ and 207, respectively, and the corresponding side walls 136 and 137 of the air chamber, terminate preferably well short of the forward end of the table, and preferably at a median point in the first angled reach of the table. As shown (Figs. 1 and 2), the forward end of these passages terminates in upwardly and forwardly slanting walls 212 and 213, respectively. By selectively positioning the rear or air current receiving ends of the respective passageways, the air current intensity through the corresponding parts of the bed may be further very nicely regulated, to effect complete and efficient separation. It will be understood that the size and location and shape of these air controlling means may be widely varied to meet the practical needs under any particular conditions of separation.

The operation of the hereinbefore described mechanism will be understood from the foregoing description, but may be summarized substantially as follows:

The table may be assumed to be covered with a bed of materials moving forwardly therealong, and progressively, undergoing stratification and separation, and delivery of the separated material. The intermixed materials are fed to the rear end of the primary separating portion of the bed at a rate to maintain the bed of proper thickness upon the table.

The relatively intense air currents passing upwardly through the bed in this area loosen apart the densely packed particles, and propel or float upwardly the particles of the lighter material, while the particles of the heavier material settle and come to rest upon the table. It is probable that in this area of greatest air-pressure intensity, some of the smaller particles of the heavier material are also floated or projected upwardly to some degree. At least the preliminary stages of stratification and separation are effected here.

The reciprocatory motion of the table imposes a forward movement upon the bed of materials as a whole, the stratified and flotant superior layer moving forwardly directly with the bed. The settled particles of heavier material at rest upon the table are impelled forwardly by friction and inertia, and are directed by the separating partitions almost immediately out of the forwardly-moving current of the bed directly to the side edge of the bed, and this material so separated is then impelled forwardly along the side edge in a separate stream.

Considering a portion of the bed just forwardly of that just described, where the air-current intensity is somewhat less, smaller particles of the heavier material will here come to rest upon the table, or will be lower than the height of the next forward separating partition. These in turn are impelled transversely out of the forwardly-moving bed to the side edge of the table, by friction and inertia and the constraint of the separating partition, and will move forwardly along the side edge of the table. This action will occur successively and progressively until the smallest particles of the heavier material finally come to rest behind the separating partitions and will be disposed of as already described.

There is thus a constantly increasing superior layer of clean lighter material, and a continuously lessening intermediate layer of still intermixed material forwardly along the table. The superior and separated layer of lighter material will move unconstrainedly directly forwardly, and will pass over the edge 8 and be discharged from the table by the discharging means already described. The second outwardly angled reach of the table carries the rock and remaining unseparated material to one side, and presents the directly-ahead discharge edge for the clean coal, or other lighter material, from the primary reach of the bed. The separating action also continues uninterruptedly in this reach of the table.

When the forwardly-flowing stream of rock or other heavier material reaches the third reach or portion of the table, and the reversely-inclined retaining wall 14, it will encounter the discharging means provided therefor, and will be immediately discharged from the table, and there is no necessity of propelling this separated and stratified settled material through the forward end of the table. By the adjustment and regulation of the gates 32 and 36, the complete discharge of the settled rock may be effected, and the discharge of the lighter material or of still intermixed material may be prevented. The rocks so discharged will be carried away by the discharge mechanism already described.

The small remaining proportion of intermixed material undergoes final separating action in this final reach of the table, and the lighter material is spilled over the edge 13, and the remainder of the rock will flow out at the forward end of the table, the separation being again regulated by the devices provided therefor. Any materials of intermediate specific gravity, such as the "bony", will be discharged over the edge 87, as already described.

From all the foregoing it will be understood that a process, mechanism and means are provided by the invention, realizing the objects and advantages; and it will be further understood that departures may be made from the details of mechanism herein shown and described within the scope of the accompanying claims, limited only as may be necessary by the prior art, without departing from the principles of the invention and without sacrificing its chief advantages.

What I claim is: —

1. A mechanism for separating intermixed divided materials differing relatively greatly in size but differing relatively little in specific gravities, including in combination an air pervious table having a main end portion merging into branch portions which diverge and thereafter converge, defining a central opening into which the lighter materials are discharged, the converging branch portions having discharge openings for the heavier materials on the outside thereof whereby the heavier material discharges straight forwardly in a plurality of streams from the front end of the table, means variably positionable vertically for controlling the discharge of the heavy materials, partitions on the table for guiding the heavier materials toward the outside edges of the table and means for reciprocating the table longitudinally.

2. A mechanism for separating intermixed divided materials differing relatively greatly in size but differing relatively little in specific gravities, including in combination an air pervious table the perviousness of which decreases toward the discharge areas thereof, having main end portions merging into branch portions which diverge and thereafter converge, defining a central opening into which the lighter materials are discharged, the converging branch portions having a plurality of discharge openings for the heavier materials on the outside thereof, partitions on the table for guiding the heavier materials toward the outside edges of the table, and means for reciprocating the table longitudinally.

3. A mechanism for separating intermixed divided materials differing relatively greatly in size but differing relatively little in specific gravities, including in combination an air pervious table having a main portion, a branch portion extending at an angle therefrom, and an end portion extending at a reverse angle from said branch portion, the inner edges of both the branch portion and the end portion forming discharge edges for the lighter materials, partitions on the main and branch portions, means for reciprocating the table longitudinally, means for passing air upwardly through the table, a bed-retaining wall extending along the outer side edges of the main, branch and end portions, and a plurality of regulable openings in said wall along the end portion for discharging the heavier material in a plurality of streams in the direction of reciprocation.

4. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, by intermittent longitudinal mechanical impulses, directly forwardly and upwardly in a laterally restrained stream straight throughout the length of said table to discharge in the direction of its impulsion, directing the settled heavier material by friction and inertia transversely of the forward movement of the flotant material and to the side of the bed, impelling the heavier material forwardly in a stream along the side of the bed substantially parallel to the movement of the flotant material, and discharging all the heavier material in a plurality of individually regulable streams flowing in the line of longitudinal reciprocation.

5. In a process for separating intermixed divided materials varying relatively greatly in size and relatively little in their specific gravities, such as unsized coal, wherein a bed of the materials of substantial depth is acted upon by lifting air currents and mechanical vibration, the steps of progressing a flotant stratum of lighter material directly forwardly against the action of gravity to discharge, permitting heavier material to settle to an inferior stratum, impelling the settled heavier material laterally out of the bed and then forwardly against the action of gravity to discharge in a plurality of relatively small, regulable streams at the final separating or front portion of the bed in a direction substantially parallel to that of the flotant stratum.

In testimony whereof, I have signed my name to this specification.

KENNETH DAVIS.